United States Patent
Tresse

(10) Patent No.: US 9,925,738 B2
(45) Date of Patent: Mar. 27, 2018

(54) ASSEMBLY OF A METAL INSERT AND A SHEET OF COMPOSITE MATERIAL, METHOD FOR INCORPORATING SUCH AN INSERT INTO SUCH A SHEET AND PART OBTAINED BY MOLDING SUCH A SHEET

(71) Applicant: Compagnie Plastic Omnium, Lyons (FR)

(72) Inventor: David Tresse, Polaincourt (FR)

(73) Assignee: Compagnie Plastic Omnium, Lyons (FR)

( * ) Notice: Subject to any disclaimer, the term of this patent is extended or adjusted under 35 U.S.C. 154(b) by 137 days.

(21) Appl. No.: 14/443,404

(22) PCT Filed: Nov. 19, 2013

(86) PCT No.: PCT/FR2013/052786
§ 371 (c)(1),
(2) Date: May 18, 2015

(87) PCT Pub. No.: WO2014/080121
PCT Pub. Date: May 30, 2014

(65) Prior Publication Data
US 2015/0290903 A1 Oct. 15, 2015

(30) Foreign Application Priority Data
Nov. 20, 2012 (FR) .................... 12 61041

(51) Int. Cl.
*B32B 3/30* (2006.01)
*B29C 70/42* (2006.01)
(Continued)

(52) U.S. Cl.
CPC ............ *B32B 3/30* (2013.01); *B29C 37/0085* (2013.01); *B29C 65/56* (2013.01); *B29C 65/64* (2013.01);
(Continued)

(58) Field of Classification Search
None
See application file for complete search history.

(56) References Cited

U.S. PATENT DOCUMENTS 3,527,629 A * 9/1970 Wylde ............... A44B 18/0015
140/81
3,704,194 A * 11/1972 Harrier ............... B29C 33/0033
156/245
(Continued)

FOREIGN PATENT DOCUMENTS

DE 3715409 A * 12/1987
DE 19834772 A1 * 2/2000
(Continued)

OTHER PUBLICATIONS

Machine Translation of JP 59201821 A, Nov. 1984.*
(Continued)

*Primary Examiner* — Jeffrey A Vonch
(74) *Attorney, Agent, or Firm* — Jacox, Meckstroth & Jenkins

(57) ABSTRACT

The assembly consists of at least one metal insert and one reinforcing sheet. The reinforcing sheet contains reinforcing fibers longer than or equal in length to one centimeter. The metal insert comprises protrusions shaped to traverse the sheet, passing between the reinforcing fibers, and to fold by plastic deformation, enclosing the reinforcing fibers when said protrusions are subjected to a longitudinal compression force.

17 Claims, 2 Drawing Sheets

(51) Int. Cl.

| | | |
|---|---|---|
| *B29C 70/82* | (2006.01) | |
| *B29C 37/00* | (2006.01) | |
| *B29C 65/56* | (2006.01) | |
| *B29C 65/64* | (2006.01) | |
| *B32B 3/26* | (2006.01) | |
| *B32B 15/08* | (2006.01) | |
| *B29C 70/86* | (2006.01) | |
| *B29C 65/00* | (2006.01) | |
| *F16B 5/00* | (2006.01) | |
| *B32B 5/02* | (2006.01) | |
| *B29C 35/02* | (2006.01) | |
| *B29C 70/02* | (2006.01) | |
| *B32B 5/28* | (2006.01) | |
| *B29C 65/72* | (2006.01) | |
| *B32B 7/08* | (2006.01) | |
| *B32B 15/14* | (2006.01) | |
| *B32B 5/26* | (2006.01) | |
| *F16B 5/07* | (2006.01) | |
| *B29K 105/08* | (2006.01) | |
| *B29K 705/00* | (2006.01) | |

(52) U.S. Cl.
CPC ............. *B29C 70/42* (2013.01); *B29C 70/82* (2013.01); *B29C 70/86* (2013.01); *B32B 3/266* (2013.01); *B32B 15/08* (2013.01); *B29C 35/02* (2013.01); *B29C 37/0082* (2013.01); *B29C 65/561* (2013.01); *B29C 65/72* (2013.01); *B29C 66/006* (2013.01); *B29C 66/034* (2013.01); *B29C 66/0324* (2013.01); *B29C 66/30321* (2013.01); *B29C 66/723* (2013.01); *B29C 66/7214* (2013.01); *B29C 66/72141* (2013.01); *B29C 66/72143* (2013.01); *B29C 66/742* (2013.01); *B29C 70/023* (2013.01); *B29K 2105/0881* (2013.01); *B29K 2705/00* (2013.01); *B32B 5/022* (2013.01); *B32B 5/26* (2013.01); *B32B 5/28* (2013.01); *B32B 7/08* (2013.01); *B32B 15/14* (2013.01); *B32B 2262/062* (2013.01); *B32B 2262/101* (2013.01); *B32B 2262/106* (2013.01); *B32B 2305/07* (2013.01); *B32B 2305/08* (2013.01); *B32B 2305/10* (2013.01); *B32B 2305/20* (2013.01); *B32B 2305/28* (2013.01); *B32B 2305/34* (2013.01); *B32B 2305/72* (2013.01); *B32B 2605/00* (2013.01); *F16B 5/0096* (2013.01); *F16B 5/07* (2013.01); *Y10T 29/49906* (2015.01); *Y10T 29/49924* (2015.01); *Y10T 428/2419* (2015.01); *Y10T 428/24174* (2015.01); *Y10T 428/24289* (2015.01); *Y10T 428/24322* (2015.01); *Y10T 428/24994* (2015.04); *Y10T 428/24995* (2015.04); *Y10T 428/249923* (2015.04); *Y10T 428/249924* (2015.04); *Y10T 428/249942* (2015.04); *Y10T 428/249945* (2015.04); *Y10T 428/249946* (2015.04); *Y10T 428/249951* (2015.04); *Y10T 428/26* (2015.01)

(56) References Cited

U.S. PATENT DOCUMENTS

| | | | | |
|---|---|---|---|---|
| 3,834,832 A * | 9/1974 | Mallinder | ............... | B29C 65/56 416/230 |
| 4,528,051 A * | 7/1985 | Heinze | .................... | B29C 70/24 156/324 |
| 4,792,475 A * | 12/1988 | Bien | .................... | B62D 29/048 403/408.1 |
| 2003/0190455 A1* | 10/2003 | Burgess | ................ | B29C 65/564 428/119 |
| 2004/0247411 A1* | 12/2004 | Nagayama | ............ | F16B 37/048 411/204 |
| 2006/0236652 A1* | 10/2006 | Kismarton | ............ | B29C 65/564 52/782.1 |
| 2007/0009712 A1* | 1/2007 | Roth | ..................... | B29C 70/088 428/172 |
| 2008/0003401 A1 | 1/2008 | Barnes et al. | | |
| 2008/0089758 A1* | 4/2008 | Meisner | .................. | F16B 39/10 411/147 |
| 2009/0087259 A1 | 4/2009 | Bettinger | | |
| 2010/0068464 A1* | 3/2010 | Meyer | ................ | B23K 15/0086 428/161 |
| 2012/0045613 A1* | 2/2012 | Sanderson | ................ | B32B 7/08 428/137 |
| 2012/0301702 A1* | 11/2012 | Nishimura | .............. | B29C 73/04 428/223 |
| 2013/0149501 A1* | 6/2013 | Pacchione | ............. | B29C 65/344 428/172 |
| 2013/0273312 A1* | 10/2013 | Campbell | ................ | B32B 7/08 428/137 |
| 2014/0059813 A1* | 3/2014 | Soeffker | .................... | F16B 5/07 24/443 |
| 2014/0318687 A1* | 10/2014 | Boettcher | ........... | F16B 15/0092 156/92 |
| 2015/0260208 A1* | 9/2015 | Baker | ..................... | B29C 65/64 403/282 |

FOREIGN PATENT DOCUMENTS

| | | | | | |
|---|---|---|---|---|---|
| DE | 102005013154 A1 | * | 10/2006 | ............. | B29C 70/86 |
| DE | 102010054097 A1 | | 6/2012 | | |
| DE | 102010061301 A1 | | 6/2012 | | |
| EP | 89755 A2 | * | 9/1983 | | |
| EP | 903216 A2 | * | 3/1999 | | |
| FR | 2800815 A1 | * | 5/2001 | ....... | B29C 45/14311 |
| FR | 2970898 A1 | * | 8/2012 | | |
| GB | 2044172 A | * | 10/1980 | ......... | B29C 37/0082 |
| GB | 2238977 A | | 6/1991 | | |
| JP | 59201821 A | * | 11/1984 | | |
| JP | 60063134 A | * | 4/1985 | | |
| JP | 60092811 A | * | 5/1985 | | |
| JP | 02074325 A | * | 3/1990 | | |
| JP | 09019970 A | * | 1/1997 | | |
| JP | 10258471 A | * | 9/1998 | | |
| JP | 2002129657 A | * | 5/2002 | | |
| SU | 545483 A | * | 3/1977 | | |
| WO | WO-9640487 A1 | * | 12/1996 | ......... | B29C 37/0082 |
| WO | WO 2014064430 A1 | * | 5/2014 | ............. | B21J 15/02 |

OTHER PUBLICATIONS

Machine Translation of JP 60092811 A, May 1985.*
Ben-Gurion University of the Negev, Chapter 16: Composites, Dec. 2005, pp. 577-617.*
Jweeg et al., Experimental and Theoretical Studies of Mechanical Properties for Reinforcement Fiber Types of Composite Materials, Aug. 2012, International Journal of Mechanical & Mechatronics Engineering, vol. 12, No. 4, pp. 62-75.*
2nd Machine Translation of JP 59-201821 A, Nov. 1984.*

* cited by examiner

ASSEMBLY OF A METAL INSERT AND A SHEET OF COMPOSITE MATERIAL, METHOD FOR INCORPORATING SUCH AN INSERT INTO SUCH A SHEET AND PART OBTAINED BY MOLDING SUCH A SHEET

CROSS-REFERENCE TO RELATED APPLICATIONS

This application is the U.S. National Phase application of PCT Application No. PCT/FR2013/052786 filed Nov. 19, 2013, which claims priority to the French application 1261041 filed on Nov. 20, 2012, which applications are incorporated herein by reference and made a part hereof.

BACKGROUND OF THE INVENTION

1. Field of the Invention

This invention concerns the technical field of parts made of composite material.

2. Description of the Related Art

Typically, a composite material comprises a reinforcement and a matrix of thermoplastic or thermosetting resin. The reinforcement may consist of short fibers, long fibers or fiber cloth. Dry reinforcing sheets to be coated with resin are known, as well as preimpregnated sheets which can be draped directly. A composite material can be shaped in particular by an injection, compression or infusion process.

For example, an assembly of composite material composed of a thermosetting polyester resin which impregnates glass fibers (20% to 30% by weight of this reinforcement), with in particular fillers and a catalyst (hardener). This assembly may comprise a polyethylene protective film on each side.

The blank is for example molded by hot compression under pressure in a closed mold, usually by moving a movable part of the mold against a fixed part of the mold.

The difficulties that arise with these parts made of composite material are their assembly and the addition or attachment of other components of the structure of a motor vehicle.

In particular, it may be necessary to weld, screw or glue the part thereto.

SUMMARY OF THE INVENTION

The invention aims to propose a solution to this problem.

This invention relates to an assembly of a metal insert and a reinforcing sheet for a composite material, wherein:

the reinforcing sheet contains reinforcing fibers of length greater than or equal to 1 cm.

the metal insert includes protrusions shaped so as to:

traverse the reinforcing sheet in its thickness going between the fibers;

fold by plastic deformation, enclosing reinforcing fibers.

According to a first embodiment, the protrusions are teeth having a sharp generally triangular end.

The assembly may also include a barrel to generate a "passage", the barrel may for example also be threaded to allow the part to be screwed or to add a screw component which traverses the reinforcing sheet by separating the fibers, therefore without damaging them.

Advantageously, the assembly has a protrusion or a barrel which traverses the reinforcing sheet without damaging it. "Without damaging it" is taken to mean that the protrusion or the barrel does not cut, tear or shear the reinforcing sheet.

The reinforcing sheet may comprise resin as preimpregnation or powder which covers substantially all the fibers.

According to a second embodiment, the reinforcing fibers consist of a unidirectional sheet of long fibers.

According to a third embodiment, the fibers consist of a fabric of long fibers.

According to a fourth embodiment, the fibers consist of cut fibers distributed randomly in the material. In this case, they have a length greater than 5 mm, preferably greater than 10 mm, ideally greater than 20 mm.

Advantageously, the fibers are carbon, glass or plant fibers.

The invention also relates to a method of incorporating an insert as described above in a reinforcing sheet, the reinforcing sheet having a thickness, a top wall and a bottom wall, wherein it comprises:

depositing the insert on the top wall of the reinforcing sheet;

pushing the protrusions of the insert through the thickness of the reinforcing sheet;

folding the protrusions by plastic deformation so that they are folded towards the bottom wall, enclosing the reinforcing fibers.

Advantageously, in a special implementation mode, the protrusions are folded by an axial or lateral force.

In a special implementation mode, the step of folding the protrusions is carried out in a mold for manufacturing a part made of composite material. Resin is taken to mean an organic material belonging to the family of thermosetting or thermoplastic polymers.

In another special implementation mode, the step of folding the protrusions is carried out before introducing the assembly in a mold for manufacturing a part made of composite material.

A particularly interesting application of the invention is to make interfaces on the edge of an assembly as described above or a resin part and/or in the middle of the sheet or part. The interfaces may be flat or interfaces with through screwing barrel (which traverses the part without damaging the fibers).

In particular, an assembly or part comprising such an insert may be more easily picked up by a robot by magnetization or by suction. This is highly advantageous since the magnetization and suction cannot generally be used on fiber sheets. The insert can also be used to produce a weld with another metal component.

The insert may further comprise a flat surface or a surface with projection for interfacing with another part, this surface can be either a flat surface for welding, magnetization or suction, or a surface forming a projection for attachment of the finished part.

Lastly, the invention relates to a part made of composite material obtained by shaping and polymerizing an assembly as described above.

In a particularly advantageous embodiment, the composite material part is a motor vehicle component.

These and other objects and advantages of the invention will be apparent from the following description, the accompanying drawings and the appended claims.

BRIEF DESCRIPTION OF THE ACCOMPANYING DRAWINGS

It will be easier to understand the invention on reading the attached figures, which are given purely by way of example and are not to be construed as limiting, in which.

DETAILED DESCRIPTION OF THE PREFERRED EMBODIMENTS

Figure 1:
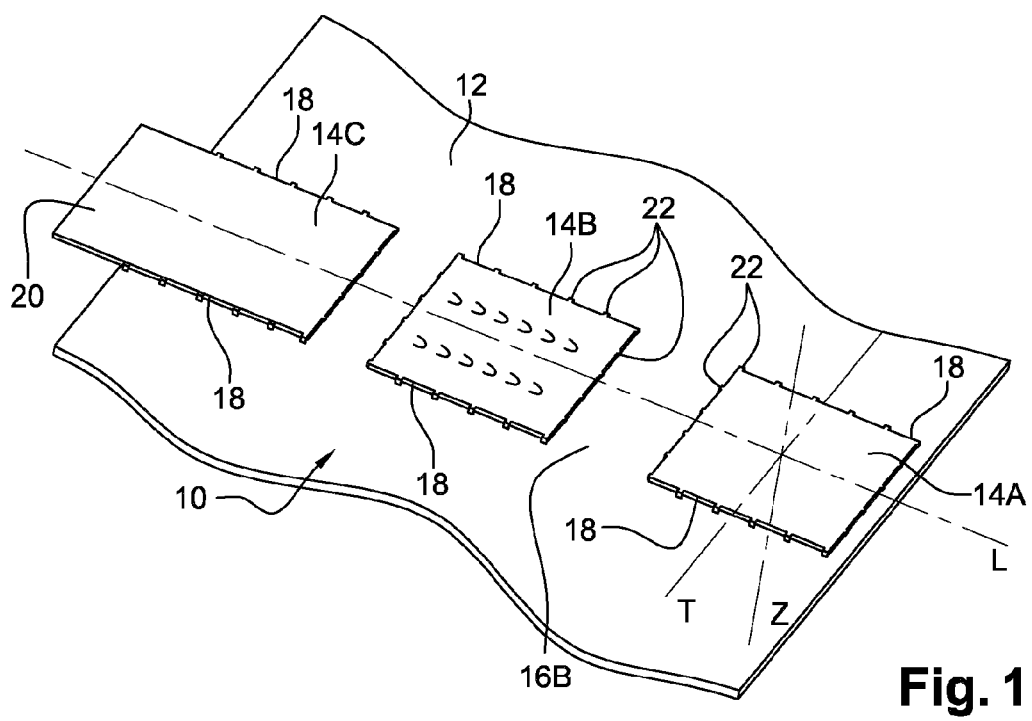
FIG. 1 is a perspective view in elevation of a portion of an assembly according to the invention.
Figure 2:
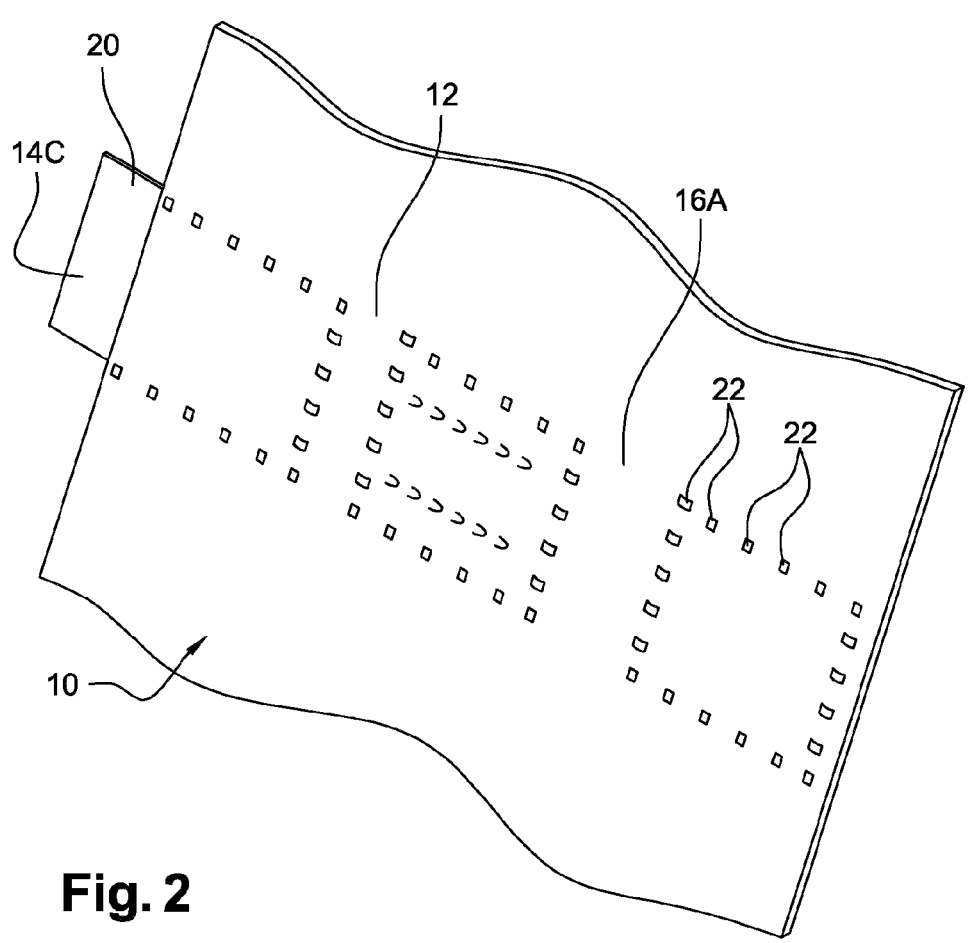
FIG. 2 is a perspective view from underneath of a portion of an assembly according to the invention.

FIGS. 1 and 2 show only a small portion of an assembly 10 provided with a reinforcing sheet for composite material 12 and three metal inserts 14A, 14B, 14C.

To simplify the description, the assembly portion is called "assembly" in the remainder of the description. The assembly 10 is defined by a longitudinal direction along an axis of symmetry L, a transverse direction along an axis T and a through direction along an axis Z.

In the example, the reinforcing sheet of composite material 12 has a rectangular shape and a thickness of 4 millimeters. It comprises a bottom wall 16A and a top wall 16B which has the metal inserts 14A, 14B, 14C arranged on the surface.

The reinforcing sheet of composite material 12 contains a resin and reinforcing fibers of length greater than or equal to 1 cm.

The reinforcing fibers are glass fibers and form layers that intertwine and overlap each other.

In the example, the metal inserts 14A, 14B, 14C are rectangular and 1 mm thick, but they could be of any shape and of thickness between 0.5 and 1.5 mm.

The metal inserts 14A, 14B, 14C define rectangles of smaller size than the sheet 12 on which they are arranged. In this case the metal inserts 14A, 14B, 14C have a longitudinal axis of symmetry which is coincident with the longitudinal axis of symmetry L of the assembly 10.

In the applications considered for the automobile sector, the size of the assembly 10 is usually much greater than that of the inserts 14A, 14B, 14C. In the example, two of the three inserts 14A, 14B, arranged on the surface of the sheet 12 define an area inside the rectangular shape defined by the sheet of composite material 12. The third insert 14C forms a rectangle longer than the other two inserts 14A, 14B and has an end 20 which extends outside the rectangular shape formed by the sheet of composite material 12.

The metal inserts 14A, 14B, 14C are provided with protrusions 22 distributed at regular intervals, i.e. every 5 mm in this case, near the edges of the inserts 14A, 14B, 14C and on a central portion of an insert 14B. These protrusions 22 form small pointed rectangular and triangular teeth that originate near the edges of the inserts 14A, 14B, 14C. They separate the fibers during insertion of the inserts 14A, 14B, 14C and traverse the reinforcing sheet for composite material 12 going between the fibers and their ends are bent substantially parallel to the bottom wall 16A of the sheet of composite material 12. Alternatively, they could be substantially bent back on themselves, their ends being directed towards the top wall 16B.

The assembly 10 could also comprise screw barrels traversing the sheet of composite material 12 and separating the fibers, therefore without damaging them. Note that these barrels are usually located in the middle of an insert rather than on its edges.

The protrusions 22 are shaped to traverse the sheet of composite material 12 without significantly destroying the reinforcing fibers but by separating them. They are folded by plastic deformation, for example like an office staple. They therefore enclose the reinforcing fibers when they are subjected to a compressive force in their longitudinal direction. The protrusions 22 may also be folded by lateral deformation and when they are on the edge of the assembly 10, they can be folded towards the outside or inside of the assembly 10.

According to a second embodiment, the reinforcing fibers are a unidirectional sheet of long fibers.

According to a third embodiment, the fibers are a fabric of long fibers, i.e. the fibers are continuous. Thus, they consist of unidirectional fibers and their length is the same as that of the part.

According to a fourth embodiment, the fibers are cut fibers distributed randomly in the material 12. In this case, their length is necessarily greater than or equal to 2 cm.

Figure 3A:
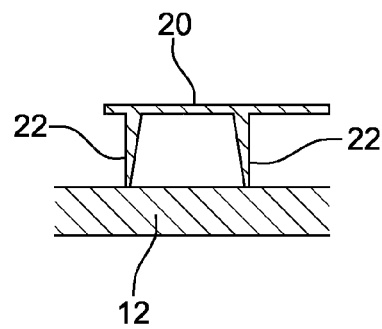
FIGS. 3A, 3B, 3C and 3D are cross-sectional representations of the steps of a method for incorporating an assembly of FIG. 1.
Figure 3B:
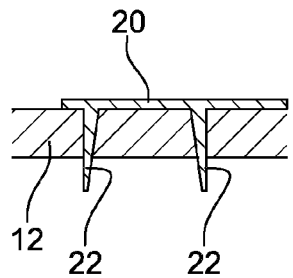
Figure 3C:
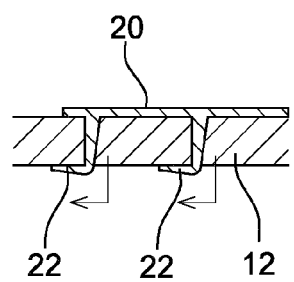
Figure 3D:
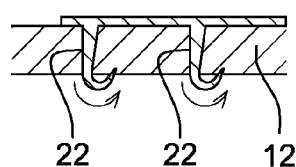

We will now describe a method of incorporating an insert as described above in a reinforcing sheet 12. As shown in FIG. 3A, a first step consists in depositing the insert on the reinforcing sheet 12. According to FIG. 3B, the protrusions 22 of the insert are pushed through the sheet 12, the protrusions 22 going between the fibers and separating them. Then, the protrusions 22 on the sheet 12 are folded by plastic deformation, either by a force applied along the Z axis or by a lateral force, so that the protrusions 22 are folded towards the sheet 12 as shown in FIG. 3D of the example. Alternatively, the protrusions 22 may be folded substantially parallel to the sheet 12 as shown in FIG. 3C.

In a special implementation mode, the step of folding the protrusions 22 is carried out in a mold for manufacturing a part made of composite material. To do this, at least one reinforcing sheet with the inserts is introduced into the mold, the mold is closed and resin is injected.

In another special implementation mode, the step of folding the protrusions 22 is carried out before introducing the assembly 10 in a mold for manufacturing a part made of composite material.

Lastly, the invention relates to a part made of composite material obtained by shaping and cross-linking an assembly 10 as described above.

Figure 4:
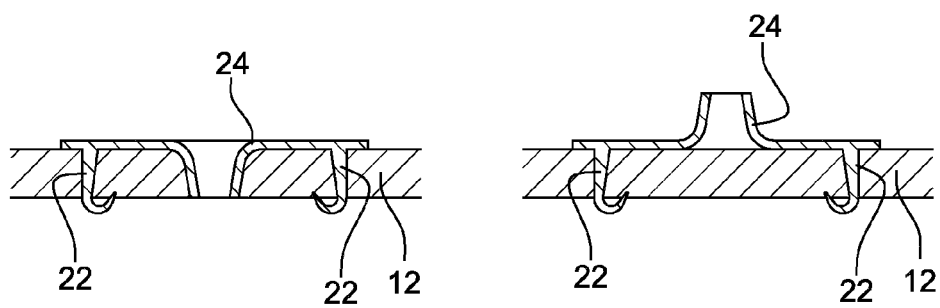
FIG. 4 shows examples of implementation of screw barrels for an assembly according to the invention.

The invention is not limited to the embodiments described and other embodiments will be clearly apparent to those skilled in the art. In particular, it is possible that the reinforcing fibers are carbon fibers, plant fibers or fibers of another material. In addition, interfaces can be produced at the edge or the middle of a part made of composite material. The interfaces may be flat or have through screwing barrel 24 as shown in FIG. 4. The sheet of composite material 12 may contain reinforcing fibers of length greater than or equal to 1 cm. The thickness of the sheet 12 may be different and its thickness may be between 0.5 mm and 10 mm, preferably between 1 mm and 7 mm, and in some configurations between 1 mm and 4 mm. The teeth of the insert may be located in its center in order to increase the number of anchorage points and to improve the tear strength. Lastly, the insert may further comprise a projection for interfacing with another part, it being possible for example to screw, weld or overmold this projection.

Applications of this assembly could be considered in particular for the manufacture of vehicle floors, side sills, A-, B- and C-pillars, opening panels, roof crossbeams, as well as beams or structural reinforcements.

While the process and method herein described constitute preferred embodiments of this invention, it is to be understood that the invention is not limited to this precise process and method, and that changes may be made therein without departing from the scope of the invention which is defined in the appended claims.

What is claimed is:

1. An assembly comprising:
    at least one metal insert and at least one reinforcing sheet of composite material, wherein:
    at least one reinforcing sheet contains reinforcing fibers longer than or equal in length to one centimeter;
    said at least one metal insert comprises protrusions shaped to:
        traverse said at least one reinforcing sheet of composite material going between said reinforcing fibers forming projected ends;
        fold towards said at least one reinforcing sheet of composite material by plastic deformation so that said projected ends of said protrusions point toward and at least partially embed in said at least one reinforcing sheet, enclosing said reinforcing fibers;
    wherein said metal insert further comprises a screw barrel which traverses said at least one reinforcing sheet of composite material by separating said reinforcing fibers.

2. The assembly according to claim 1, wherein said protrusions have a sharp end.

3. The assembly according to claim 1, wherein said screw barrel traverses said at least one reinforcing sheet of composite material without damaging said at least one reinforcing sheet of composite material.

4. The assembly according to claim 1, wherein said reinforcing fibers are a unidirectional sheet of long fibers.

5. The assembly according to claim 1, wherein said reinforcing fibers consist of cut fibers distributed randomly in said at least one reinforcing sheet of composite material.

6. The assembly according to claim 1, wherein said reinforcing fibers are carbon, glass or plant fibers.

7. The assembly according to claim 2, wherein a screw barrel traverses said at least one reinforcing sheet of composite material without damaging said at least one reinforcing sheet of composite material.

8. The assembly according to claim 2, wherein said reinforcing fibers are a unidirectional sheet of long fibers.

9. The assembly according to claim 2, wherein said reinforcing fibers are carbon, glass or plant fibers.

10. A method of incorporating a metal insert in at least one reinforcing sheet of composite material wherein said method comprises the steps of:
    providing at least one reinforcing sheet of composite material, wherein said at least one reinforcing sheet contains reinforcing fibers longer than or equal in length to one centimeter;
    providing at least one metal insert comprising shaped protrusions;
    depositing said at least one metal insert on said at least one reinforcing sheet of composite material;
    pushing said protrusions through said at least one reinforcing sheet of composite material going between said reinforcing fibers forming projected ends;
    folding by plastic deformation said protrusions toward said at least one reinforcing sheet of composite material so that said projected ends of said protrusions point toward and at least partially embed in said at least one reinforcing sheet, enclosing said reinforcing fibers;
    wherein said metal insert further comprises a screw barrel which traverses said reinforcing sheet of composite material by separating said reinforcing fibers.

11. The method according to claim 10, wherein said protrusions are folded by an axial or lateral force.

12. The method according to claim 10, wherein the step of folding said protrusions is carried out before introducing an assembly in a mold for manufacturing a part made of composite material.

13. The method according to claim 10, wherein the step of folding said protrusions is carried out in a mold for manufacturing a part made of a composite material.

14. The method according to claim 13, wherein said protrusions are folded by an axial or lateral force.

15. A part made of composite material wherein said part is obtained by shaping and polymerizing an assembly comprising:
    at least one metal insert and at least one reinforcing sheet of composite material, wherein:
    at least one reinforcing sheet contains reinforcing fibers longer than or equal in length to one centimeter;
    said at least one metal insert comprises protrusions shaped to:
        traverse said at least one reinforcing sheet of composite material going between said reinforcing fibers forming projected ends;
        fold towards said at least one reinforcing sheet of composite material by plastic deformation so that said projected ends of said protrusions point toward and at least partially embed in said at least one reinforcing sheet, enclosing said reinforcing fibers;
    wherein said metal insert further comprises a screw barrel which traverses said at least one reinforcing sheet of composite material by separating said reinforcing fibers.

16. The part made of composite material according to claim 15, wherein said protrusions have a sharp end.

17. The part made of composite material according to claim 15, said part being a motor vehicle component.

* * * * *

UNITED STATES PATENT AND TRADEMARK OFFICE
CERTIFICATE OF CORRECTION

PATENT NO. : 9,925,738 B2  
APPLICATION NO. : 14/443404  
DATED : March 27, 2018  
INVENTOR(S) : David Tresse Page 1 of 1

It is certified that error appears in the above-identified patent and that said Letters Patent is hereby corrected as shown below:

On the Title Page

Item (71) Applicant, delete "Lyons" and insert --Lyon-- therefor.
Item (73) Assignee, delete "Lyons" and insert --Lyon-- therefor.

In the Claims

Column 5, Line 10, Claim 1 insert --said-- before "at least one".
Column 6, Line 5, Claim 10 delete "said" after "pushing".
Column 6, Line 32, Claim 15 insert --said-- before "at least one".

Signed and Sealed this
First Day of May, 2018

Andrei Iancu
*Director of the United States Patent and Trademark Office*